United States Patent [19]

Sumiya et al.

[11] Patent Number: 4,722,250

[45] Date of Patent: Feb. 2, 1988

[54] ACCUMULATOR BACK PRESSURE CONTROL APPARATUS FOR AUTOMATIC TRANSMISSION

[75] Inventors: Koji Sumiya, Nishio; Yoshikazu Sakaguchi, Anjo; Takuji Taniguchi, Okazaki; Yutaka Taga, Aichi; Yoshio Shindo, Toyota, all of Japan

[73] Assignees: Aisin-Warner Kabushiki Kaisha; Toyota Jidosha Kabushiki Kaisha, both of Aichi, Japan

[21] Appl. No.: 846,045

[22] Filed: Mar. 31, 1986

[30] Foreign Application Priority Data

Jul. 31, 1985 [JP] Japan ................ 60-196193
Feb. 8, 1986 [JP] Japan ................ 61-26450

[51] Int. Cl.$^4$ .......................................... B60K 41/16
[52] U.S. Cl. ............................... 74/867; 74/868
[58] Field of Search ...................... 74/867, 868, 869

[56] References Cited

U.S. PATENT DOCUMENTS

| | | | |
|---|---|---|---|
| 2,923,175 | 2/1960 | Perkins | 74/740 |
| 3,000,230 | 9/1961 | Froslie | 74/869 |
| 3,296,884 | 1/1967 | Leonard | 74/869 X |
| 3,501,979 | 3/1970 | Forster et al. | 74/869 |
| 3,621,737 | 11/1971 | Uozumi | 74/868 |
| 3,656,372 | 4/1972 | Chana | 74/869 |
| 3,724,292 | 4/1973 | Borman | 74/869 |
| 3,752,011 | 8/1973 | Casey et al. | 74/866 |
| 3,752,015 | 3/1973 | Murakami | 74/869 |
| 3,842,693 | 10/1974 | Oberpichler | 74/868 |
| 3,952,614 | 4/1976 | Iijima | 74/868 |
| 3,956,947 | 5/1976 | Leising et al. | 74/866 |
| 4,021,712 | 5/1977 | Ishihara et al. | 74/866 |
| 4,034,628 | 7/1977 | Sakai et al. | 74/869 |
| 4,106,369 | 8/1978 | Taga | 74/868 X |
| 4,155,277 | 5/1979 | Minami et al. | 74/866 |
| 4,253,553 | 3/1981 | Yamada et al. | 74/869 |
| 4,274,307 | 6/1981 | Iwanaga et al. | 74/869 |
| 4,274,308 | 6/1981 | Iwanaga et al. | 74/869 |
| 4,314,488 | 2/1982 | Lauren | 74/869 X |
| 4,324,153 | 4/1982 | Sugimoto et al. | 74/866 |
| 4,324,321 | 4/1982 | Ushijima et al. | 192/13 R |
| 4,334,441 | 6/1982 | Iwanaga et al. | 74/869 |
| 4,349,088 | 9/1982 | Ito et al. | 192/3.3 |
| 4,360,092 | 11/1982 | Muller et al. | 192/13 R |
| 4,367,528 | 1/1983 | Kawamoto et al. | 74/866 X |
| 4,367,812 | 1/1983 | Kobayashi et al. | 192/3.3 |
| 4,393,467 | 7/1983 | Miki et al. | 74/866 X |
| 4,406,181 | 9/1983 | Kubo et al. | 74/869 |
| 4,411,174 | 10/1983 | Yokoi et al. | 74/866 |
| 4,432,255 | 2/1984 | Borman et al. | 74/868 |
| 4,445,401 | 5/1984 | Ishimura | 74/868 X |
| 4,485,695 | 12/1984 | Kawamoto | 74/868 |
| 4,494,640 | 1/1985 | Honig | 74/868 |
| 4,497,222 | 2/1985 | Nagaoka et al. | 74/869 |
| 4,512,212 | 4/1985 | Ishikawa | 74/733 X |
| 4,527,678 | 7/1985 | Pierce et al. | 74/866 |
| 4,532,829 | 8/1985 | Sugano | 74/869 |
| 4,555,964 | 12/1985 | Sugano | 74/865 |
| 4,563,918 | 1/1986 | Sugand | 74/869 |
| 4,570,511 | 2/1986 | Nishimura et al. | 74/868 |
| 4,573,375 | 3/1986 | Hamada et al. | 74/867 |
| 4,576,062 | 3/1986 | Reppert et al. | 74/740 |
| 4,580,466 | 4/1986 | Iwanaga | 74/869 |
| 4,588,059 | 5/1986 | Miki et al. | 192/3.31 X |
| 4,602,529 | 7/1986 | Sugano | 74/869 |
| 4,617,841 | 10/1986 | Ideta | 74/869 X |

FOREIGN PATENT DOCUMENTS

| | | | |
|---|---|---|---|
| 123041 | 9/1980 | Japan | 74/869 |
| 37140 | 3/1981 | Japan | . |
| 183147 | 10/1984 | Japan | . |
| 231059 | 11/1985 | Japan | 74/866 |
| 237256 | 11/1985 | Japan | 74/866 |

*Primary Examiner*—Leslie Braun
*Assistant Examiner*—Dirk Wright
*Attorney, Agent, or Firm*—Wenderoth, Lind & Ponack

[57] ABSTRACT

An accumulator control device for controlling the back pressure of an accumulator includes an accumulating control valve having a first port communicating with a control oil source and a second port communicating with an accumulator back pressure chamber. The accumulator control valve is controlled by a oil pressure from a shift control. According to the control position of the shift control, the accumulator control valve controls the communicating state of the first and second ports to increase or decrease the back pressure of the accumulator.

4 Claims, 12 Drawing Figures

FIG. 5

| position | | solenoid valve | | | | | clutch | | | brake | | | | OWC | | |
|---|---|---|---|---|---|---|---|---|---|---|---|---|---|---|---|---|
| | | $S_1$ | $S_2$ | $S_3$ | $S_L$ | $S_D$ | $C_0$ | $C_1$ | $C_2$ | $B_0$ | $B_1$ | $B_2$ | $B_3$ | $F_0$ | $F_1$ | $F_2$ |
| P | | × | ○ | × | × | × | ○ | × | × | × | × | × | × | × | × | × |
| R | | × | ○ | × | × | × | ○ | × | ○ | × | × | × | ○ | ○ | × | × |
| N | | × | ○ | × | × | × | ○ | × | × | × | × | × | × | × | × | × |
| D | 1st | × | ○ | × | × | × | ○ | ○ | × | × | × | × | × | ○ | × | ⊗ |
| D | 2nd | × | ○ | ○ | ◎ | ※ | ○ | ○ | × | ○ | × | × | × | × | × | ⊗ |
| D | 3rd | ○ | ○ | × | ◎ | ※ | ○ | ○ | × | × | × | ○ | × | ○ | ⊗ | × |
| D | 4th | ○ | ○ | ○ | ◎ | × | × | ○ | × | ○ | × | ○ | × | × | ⊗ | × |
| D | 5th | ○ | × | × | ◎ | × | ○ | ○ | ○ | × | × | ○ | × | ○ | × | × |
| D | 6th | ○ | × | ○ | ◎ | × | × | ○ | ○ | × | × | ○ | × | × | × | × |
| D | (5th) | × | × | × | × | × | ○ | ○ | ○ | × | × | ○ | × | ○ | × | × |
| S | 1st | × | ○ | × | × | × | ○ | ○ | × | × | × | × | × | ○ | × | ⊗ |
| S | 2nd | × | ○ | ○ | ◎ | ※ | × | ○ | × | ○ | × | × | × | × | × | ⊗ |
| S | 3rd | ○ | ○ | × | ◎ | ※ | ○ | ○ | × | × | ○ | ○ | × | ○ | ○ | × |
| S | 4th | ○ | ○ | ○ | ◎ | × | × | ○ | × | ○ | ○ | ○ | × | × | ○ | × |
| S | 5th | ○ | × | × | ◎ | × | ○ | ○ | ○ | × | ○ | ○ | × | ○ | × | × |
| S | 6th | ○ | × | ○ | ◎ | × | × | ○ | ○ | ○ | ○ | ○ | × | × | × | × |
| S | (5th) | × | × | × | × | × | ○ | ○ | ○ | × | ○ | ○ | × | ○ | × | × |
| L | 1st | × | ○ | × | × | × | ○ | ○ | × | × | × | × | ○ | ○ | × | ○ |
| L | 2nd | × | ○ | ○ | ◎ | ※ | × | ○ | × | ○ | × | × | ○ | × | × | ○ |
| L | 3rd | ○ | ○ | × | ◎ | ※ | ○ | ○ | × | × | ○ | ○ | × | ○ | ○ | × |
| L | 4th | ○ | ○ | ○ | ◎ | × | × | ○ | × | ○ | ○ | ○ | × | × | ○ | × |
| L | (1st) | × | × | × | × | × | ○ | ○ | × | × | × | × | ○ | ○ | × | ○ |

| note | | | | |
|---|---|---|---|---|
| ○ | ON | | engaged | locked |
| × | OFF | | released | free |
| ◎ | ON L-UP ON / OFF L-UP OFF | | — | — |
| ⊗ | — | | — | free when coasting |
| ※ | actuated when sifting 2→3 | | | |

6th

R

ACCUMULATOR BACK PRESSURE CONTROL APPARATUS FOR AUTOMATIC TRANSMISSION

BACKGROUND OF THE INVENTION

This invention relates to an automatic transmission of an automobile, particularly to a controlling hydraulic circuit preferably applicable to a control apparatus of a multistage automatic transmission comprising a combination of a main shifting unit and a sub-shifting unit, and more particularly to an accumulator back pressure control apparatus disposed in the hydraulic circuit.

Generally, an automatic transmission includes a torque converter and a planetary shift gear mechanism. The shift gear mechanism comprises an overdrive (O/D) or underdrive (U/D) planetary gear unit, a front planetary gear unit and a rear planetary gear unit. The shift gear mechanism obtains four forward stages and one rear stage by employing two solenoid valves and three shift valves.

Heretofore, the aforementioned automatic transmission is provided with accumulators for an O/D direct clutch $C_o$, O/D brake $B_o$, direct clutch $C_2$ and second brake $B_2$ in order to reduce shock, i.e, shift shock at the time when the respective clutches and brakes are engaged. Further, the respective accumulators for $B_o$, $C_2$ and $B_2$ are subjected to oil pressure at back pressure chambers thereof from an accumulator control valve, so that a shift shock associated with a low throttle opening is more reduced.

The aforementioned accumulator back pressure is controlled by only a throttle pressure and comprises one kind of hydraulic characteristics irrespective of a gear shift position. By this, all accumulators, i.e. engaging hydraulic characteristics of a hydraulic servo for the respective friction engaging elements, are controlled. Because of the foregoing, a most proper accumulator back pressure can not be fed for each hydraulic servo for effecting an engaging operation when each of the shifting operations is effected. The foregoing is an obstacle for obtaining a smooth shifting operation with less shifting shock.

Particularly in recent time, there has been proposed an automatic transmission for obtaining a multistage shifting through various combinations of engaging operations of clutches and brakes. In such an automatic transmission, a shifting shock is a large problem for an accumulator back pressure comprising one kind of hydraulic characteristic as mentioned above.

For example, as disclosed in a Japanese Laid-open Patent Application No. 57(1982)-37140, there has been proposed an automatic shift control apparatus for obtaining six forward stages of a shifting stage, wherein three solenoid valves and three shifting valves are provided. A sub-shifting unit which can shift between overdrive and a direct-connection stage is used in combination with a main shifting unit which can shift between first, second and third speed stages. In this case, however, if the conventional accumulator back pressure control apparatus is used as it is, there arises such a problem as follows. That is, when the main shifting unit is up shifted (first speed to second speed) with the sub-shifting unit held in the overdrive state, a torque to be transmitted to the main shifting unit becomes small. Due to the foregoing, if the oil pressure is set the same as in the case when the sub-shifting unit is held in the directly connected state, the brake $B_2$ (and clutch $C_2$) capacity becomes excessive and a large shift shock is produced. Similarly, when the sub-shifting unit is up shifted (direct connection to O/D) with the main shifting unit held in the low speed (first speed) state (accordingly, first speed to second of a transmission as a whole), if the oil pressure is set the same as in case when the sub-shifting unit is up shifted with the main shifting unit is held in the high speed (direct connection) state (fifth speed to sixth speed of a transmission as a whole), the brake $B_o$ capacity of the sub-shifting unit becomes excessive and a large shift shock is produced.

SUMMARY OF THE INVENTION

It is therefore an object of the present invention to provide a hydraulic circuit for controlling an automatic transmission, wherein an accumulator control means to be operated by a shift control means is provided to properly control the accumulator back pressure according to the respective gear shift positions in order to overcome the aforementioned problems inherent in the prior art.

The present invention was accomplished in view of the above problem. According to the feature of the present invention, as shown in FIG. 1 for example, an accumulator control means 70 for controlling the back pressure of accumulators $B_oA$, $C_2A$ and $B_2A$ is provided. The accumulator control means 70 includes a first port $l_2$ (or d) communicating with a control oil source and a second port $u_1$ communicating with accumulator back pressure chambers 59, 60 and 61, and is controlled by oil pressure transferred to $j_2$ from a control means 51. And, according to the control position of the shift control means 51, the accumulator control means 70 controls the communicating states of the first and second ports $l_2$ (or d) and $u_1$ in order to increase or decrease the back pressure of the accumulators $B_oA$, $C_2A$ and $B_2A$.

Due to the aforementioned constitution of the present invention, according to the control position of the shift control means 51, the accumulator control means 70 controls the communicating states of the first port communicating with the control oil source and the second port communicating with the the accumulator back pressure chambers in order to increase or decrease the back pressure of the accumulators. Accordingly, the accumulator characteristics can be controlled according to the shift position. Due to the foregoing, there can be obtained a proper accumulator capacity corresponding to a load torque acting on a frictional engagement element. As a result, the gear shift shock can be reduced to obtain an improved shift feeling.

BRIEF DESCRIPTION OF THE DRAWINGS

FIG. 5 is an illustration showing operating states of respective devices employed in the automatic transmission shown in FIG. 2 in their respective positions.

DESCRIPTION OF THE PREFERRED EMBODIMENT

Preferred embodiments of the present invention will be described hereunder with reference to the accompanying drawings.

Figure 1:
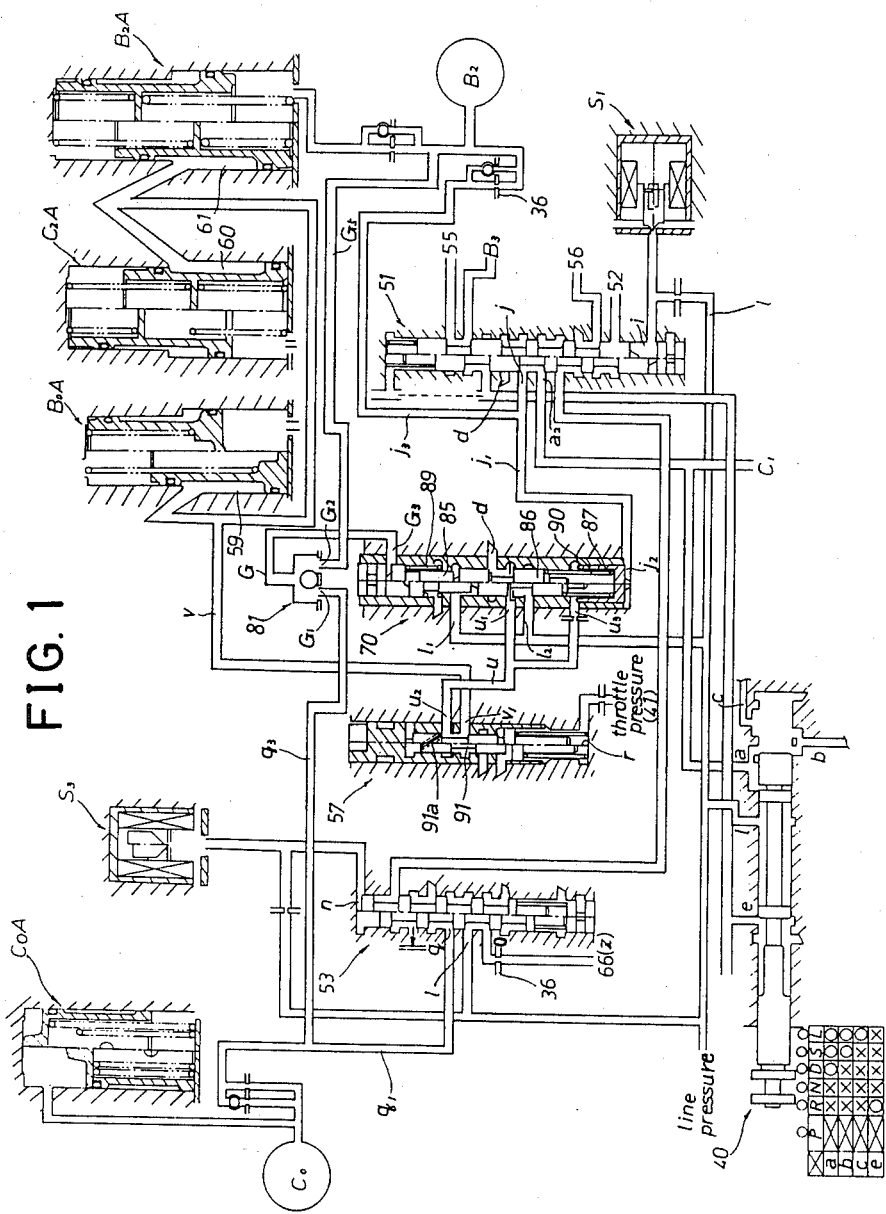
FIG. 1 is an illustration showing an accumulator back pressure control apparatus according the present invention.

As one example, as shown in FIG. 1, a second accumulator control valve 70 constituting an accumulator control means includes a spool 86 upwardly biased by a spring 90. The second accumulator control valve 70 further includes line pressure (first) ports $l_1$ and $l_2$ to be fed with a line pressure, a drain port d, a pressure controlling (second) out port $u_1$ and a feed back pressure port $u_3$. Further, the control valve 70 includes an upper oil chamber $G_3$ and a lower oil chamber $j_2$. The lower oil chamber $j_2$ communicates with an oil path $j_1$ from a first shift valve constituting a shift control means. On the other hand, the upper oil chamber $G_3$ communicates with a second brake hydraulic servo $B_2$ or an O/D direct clutch hydraulic servo $C_o$ through an inter-switching check valve 81. A first accumulator control valve 57 includes an in-port $u_2$ communicating with the pressure controlling out-port $u_1$, an out-port $v_1$ communicating with respective back pressure chambers 59, 60 and 61 of a $B_o$ brake accumulator $B_oA$, $C_2$ clutch accumulator $C_2A$, and $B_2$ brake accumulator $B_2A$, and a control oil chamber r to be fed with a throttle pressure. The first accumulator control valve 57 is adapted to control the back pressure from the out-port $v_1$ based on the throttle pressure of the control oil chamber r, so that the back pressure will be dropped around the throttle low opening degree.

With the above constitution, when the shift control means 51 is actuated, that is, when the shifting operation is effected, oil pressure according to the operating position of the shift control means 51 is fed to an oil chamber $j_2$ of the accumulator control means 70. Due to the foregoing, the accumulator control means 70 changes the communicating state of the first port (for example, the port $l_2$ communicating with the line pressure line or drain port d) communicating with the control oil source and the second port $u_2$. For example, the line port $l_2$ is entirely in communication with the pressure controlling port $u_2$ to apply the line pressure to the port $u_2$, the pressure controlling port $u_2$ communicates with the line port $l_2$ and drain port d which apply a predetermined reduced pressure to the port $u_2$, or the pressure controlling port $u_2$ communicates with the drain port d which applies zero oil pressure thereto. Further, the oil pressure which varies according to the shift positions is applied to the back pressure chambers 59, 60 and 61 of the accumulators $B_oA$, $C_2A$ and $B_2A$ to control the characteristics of the respective accumulators according to the shifting stages.

Specifically, when the transmission 1 as a whole is in first speed, i.e., when the sub-shifting unit 16 is in the directly connected state due to actuation of the O/D direct clutch $C_o$ and the main shifting unit 21 is in a first speed state due to actuation of the forward clutch $C_1$ (see FIG. 6), oil pressure a hydraulic servo of the O/D direct clutch $C_o$ (hereinafter simply referred to as "clutch $C_o$", and the same is applicable to other clutches and brakes) is fed to the upper oil chamber $G_3$ of the second accumulator control valve 70 through the port $G_1$ of the inter-switching check valve 81. Accordingly, in the foregoing state, the second valve 70 is held in the left half position, the line pressure of the line pressure port $l_2$ is fed to the port $u_2$ of the first accumulator control valve 57 through the port $u_1$ without there being a reduction in pressure. And, the oil pressure properly pressure controlled by the first valve 57 based on the throttle pressure within the oil chamber r is fed to the back pressure chambers 59, 60 and 61 of the respective accumulators $B_oA$, $C_2A$ and $B_2A$.

Figure 7:
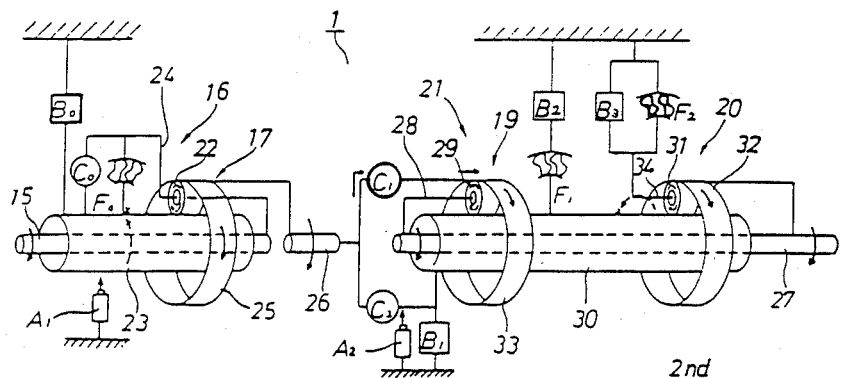

And, when the transmission as a whole is shifted from first speed to second speed, the main shifting unit 21 is held in the first speed state with only the forward clutch $C_1$ engaged, while the sub-shifting unit 16 is up shifted from the directly connected state to O/D with the brake $B_o$ engaged and O/D direct clutch $C_o$ released (FIG. 7). Then, the oil pressure fed to the upper oil chamber $G_3$ from the clutch $C_o$ is released, and the second accumulator control valve 70 is shifted to the right half position shown in FIG. 1. In the foregoing state, the line pressure from the port $l_1$ and the feed back pressure from the port $u_3$ are balanced, and the oil pressure from the line pressure port $l_2$ is transferred through the pressure controlling out-port $u_1$ after being reduced in pressure by a predetermined quantity. And, the reduced oil pressure is fed to the in-port $u_2$ of the first accumulator control valve 57. Accordingly, in the foregoing state, the pressure oil to be fed to the back pressure chamber 59 of the accumulator $B_oA$ is reduced in pressure by a predetermined quantity to reduce the torque capacity of the $B_o$ accumulator $B_oA$ according to the transmitting torque.

Figure 8:
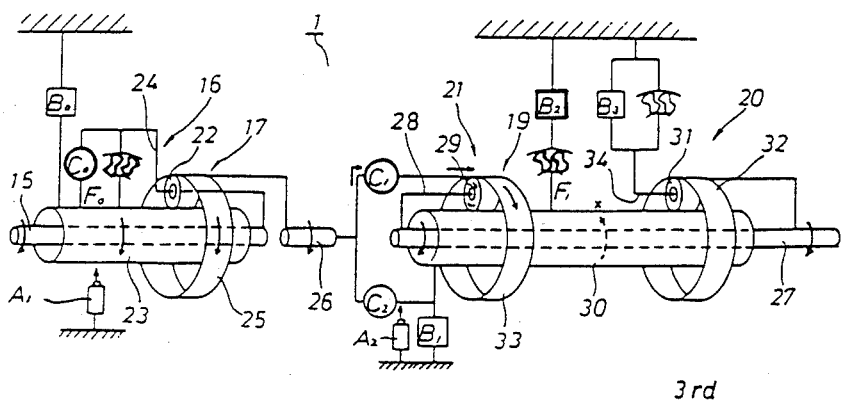

Further, when the transmission as a whole is shifted from second speed to third, the main shifting unit 21 is shifted to be in the second speed state due to engagement of the brake $B_2$ in addition to engagement of the forward clutch $C_1$, while the sub-shifting unit 16 is down shifted from O/D to the directly connected state due to release of the brake $B_o$ and engagement of the clutch $C_o$ (see FIG. 8). At this time, as the oil pressure is fed to the O/D direct clutch $C_o$ and brake $B_2$, the oil pressure is fed to the upper oil chamber $G_3$. At the same time, due to shifting of the first shift valve 51 to the left half position, the line pressure from the port $a_2$ is fed directly to the lower oil chamber $j_2$ through the oil path $j_1$. However, since the shifting of the third shaft valve 53 due to the turning off of a solenoid valve $S_3$ is effected at the same time when the shifting of the main shifting unit 21 is finished and the oil pressure is fed to an oil path $G_5$ through an orifice 36, the oil pressure is more quickly fed to the lower oil chamber $j_2$ directly through the oil path $j_1$ than to the upper oil chamber $G_3$ based on the feeding of oil pressure to the clutch $C_o$ and brake $B_2$. Due to the foregoing, the energizing force of the spring 90 is increased due to the feeding of a pressure oil to the lower oil chamber $j_2$ of the second accumulator control valve 70 and the spool 86 is further moved upwardly. As a result, the oil pressure from the line pressure port $l_2$ is further reduced in pressure by a predetermined quantity and is transferred through the pressure controlling out-port $u_1$. Accordingly, in the foregoing state, a further reduced oil pressure is fed to the back pressure chamber 61 of the $B_2$ accumulator $B_2A$ to reduce the capacity of the accumulator $B_2A$ according to the transmitting torque of the brake $B_2$. And, when the brake $B_2$ is smoothly engaged due to the feeding of oil pressure through the orifice 36, the oil pressure to the brake $B_2$ is fed to the upper oil chamber $G_3$ through the port $G_2$ of the inter-switching check valve 81 to shift the second valve 70 to the left half position. As a result, the line pressure of the port $l_2$ is fed directly to the in-port $u_2$ of the first valve 57 through the port $u_1$.

Further, when the transmission as a whole is shifted to third speed, fourth speed, fifth and sixth speed (see FIGS. 8 through 11), the second accumulator control valve 70 is held in the left half position due to the feeding of oil pressure to the brake $B_2$, and the line pressure is fed to the in-port $u_2$ of the second valve 57 as in the case when the transmission as whole is in first speed.

Although there has been described one embodiment, in which the present invention is applied to a multistage automatic transmission comprising a combination of one O/D planetary gear unit and two planetary gear units, the present invention is not limited to this. Alternatively, the present invention can of course is applied to a multistage automatic transmission comprising a combination of one U/D planetary gear unit and two planetary gear units, a split type four stage automatic transmission (see Japanese Laid-open Patent Application No. 59(1984)-183147, for example) comprising two planetary gear units separated by clutch, etc., a four stage automatic transmission comprising two planetary gear units of non-split type, a multistage automatic transmission comprising a combination of these four stage automatic shifting mechanisms and O/D or U/D planetary gear unit, and in some cases a general three stage automatic transmission.

There will be described a more detailed embodiment, in which the present invention is applied to a multistage automatic transmission.

Figure 2:
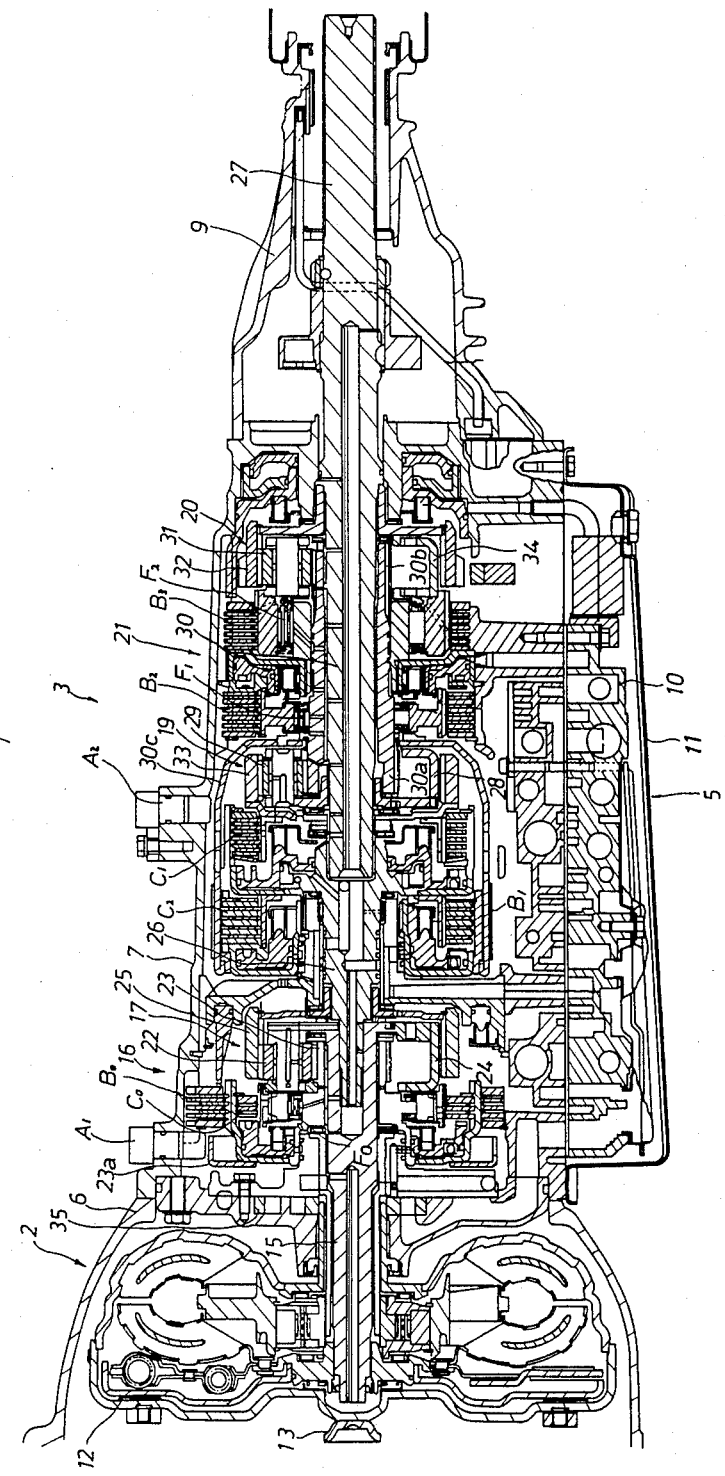
FIG. 2 is an overall sectional view showing an automatic transmission incorporating the present invention.

The multistage automatic transmission 1, as shown in FIG. 2, includes a torque converter 2, a planetary shifting gear mechanism 3 and a hydraulic control mechanism 5, which are contained in a converter housing 6, a transmission case 7 and extension housing 9, and a valve body 10 and oil pan 11, respectively. The torque converter 2 includes a lock-up clutch 12. Rotation of an input member 13 is transmitted to an input shaft 15 of the shifting gear mechanism 3 through an oil flow of the torque converter 2 or directly by the lock-up clutch 12. The shifting gear mechanism 3 comprises a sub-shifting unit 16 including an overdrive (O/D) planetary gear unit 17 and a main shifting unit 21 including a front planetary gear unit 19 and a rear planetary gear unit 20. The O/D planetary gear unit 17 comprises a carrier 24 directly connected to the input shaft 15 and supporting a planetary gear 22, a sun gear 23 mounted on the input shaft 15, and a ring gear 25 connected to the input shaft 26 of the main shifting unit 21. Interposed between the carrier 24 and the sun gear 23 are the O/D direct clutch $C_o$ and one-way clutch $F_o$. Interposed between the sun gear 23 and the case 7 is the O/D brake $B_o$. The front planetary gear unit 19 comprises a carrier 28 directly connected to the output shaft 27 and supporting the planetary gear 29, a sun gear 30a mounted on the output shaft 27 and integrally formed with the sun gear 30b of the rear planetary gear unit 20, and a ring gear 33 connected to the input shaft 26 through a forward clutch $C_1$. Interposed between the input shaft 26 and the sun gear 30 is a direct clutch $C_2$. Interposed between the sun gear 30 and the case 7 is a second coast brake $B_1$. Further, interposed between the sun gear 30 and the case 7 are a one-way clutch $F_1$ and a second brake $B_2$ for locking an outer-race of the clutch $F_1$. The rear planetary gear unit 20 comprises a carrier 34 supporting the planetary gear 31, the sun gear 30b and a ring gear 32 directly connected to the output shaft 27. Between the carrier 34 and case 7, first and Rev brakes $B_3$ and a one-way clutch $F_2$ are interposed in a parallel relation to one another. In FIG. 2, reference numeral 35 denotes an oil pump.

The case 7 of the O/D planetary gear unit 17 portion is provided with a rotary sensor $A_1$ comprising an opto-electric sensor or a magnetic sensor, etc. A flange piece 23a connected to the sun gear 23 is formed with cut-outs or holes equally spaced thereon. Accordingly, the rotary sensor $A_1$ detects the rotating speed of the sun gear 23, i.e. the shifting state of the sub-shifting unit 16. The case 7 of the front planetary gear unit 19 portion is also provided with a rotary sensor $A_2$. Similarly, a clutch connecting piece 30c extending from the sun gear 30 is formed with cut-outs or holes equally spaced thereon. Accordingly, the rotary sensor $A_2$ detects the rotating speed of the sun gear 30, i.e. the shifting state of the main shifting unit 21.

Figure 3:
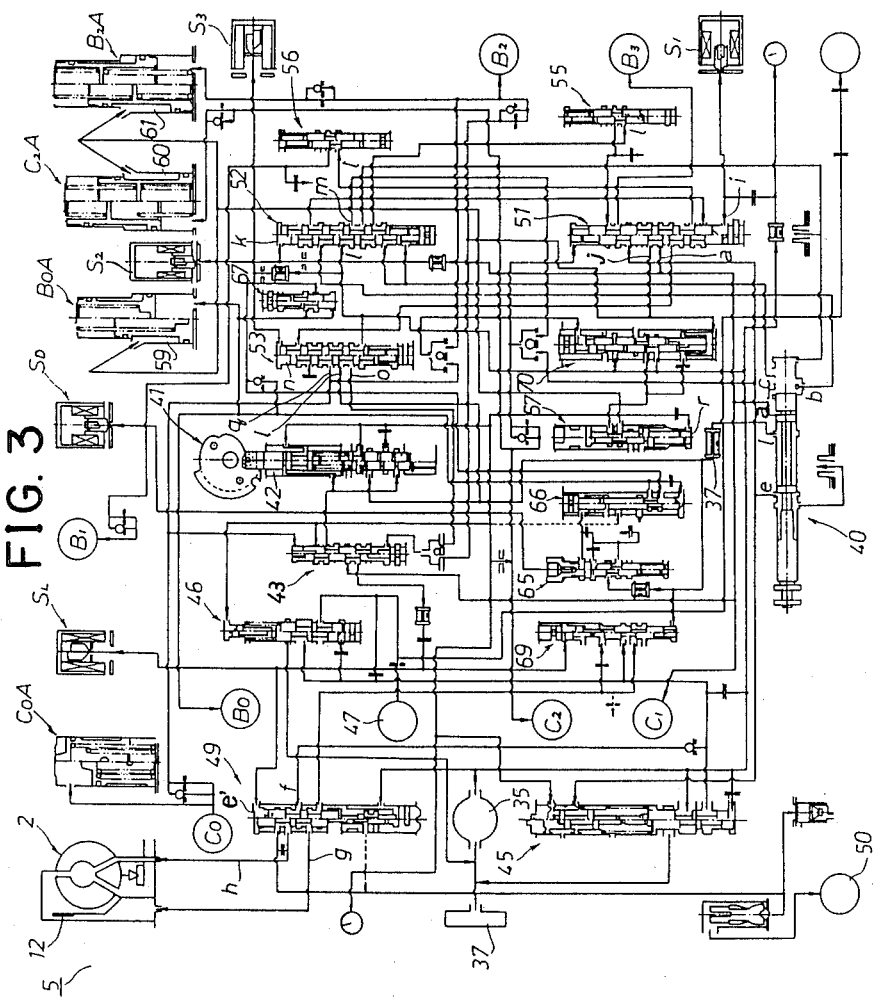
FIG. 3 is an overall view showing a hydraulic circuit for controlling the automatic transmission shown in FIG. 2.

On the other hand, the hydraulic shift control mechanism 5 comprises, as shown in FIG. 3, a number of valves, accumulators, orifices, filters, and the like. The respective valves will be described hereinafter. A manual valve 40 is shifted to the respective ranges of P, R, N, D, S and L by a shift lever, and respective oil paths a, b, c and e are shifted respectively, as shown in FIG. 1. The oil path 1 is fed with a line pressure. A throttle valve 41 is provided with a down shift plug 42. A cam is rotated according to a stepping-on operation of an accelerator pedal to obtain a throttle pressure corresponding to the engine output. A cut-back valve 43 generates a cutback pressure to act on the throttle valve 41 when the transmission 1 at more than second speed as a whole primary regulator valve 45 is pressure controlled by the throttle pressure and generates a line pressure corresponding to a load. That is, when the load is high, the line pressure is increased to obtain an operation pressure of the clutches C ... and brakes B ... On the other hand, when the load is low, the line pressure is controlled to be low. A secondary regulator valve 46 is pressure controlled by oil pressure from the primary regulator valve 45 and controls a converter oil pressure and to lubricating oil pressure to be fed to the converter 2 and respective lubricating parts 47. A lock-up relay valve 49 and a lock-up control valve 69 are controlled by a solenoid valve $S_L$ to shift the oil flow communicating to the lock-up clutch 12 and an oil cooler 50. That is, when the solenoid valve $S_L$ is turned on, an upper end oil chamber e' is subjected to the line pressure. Due to the foregoing, an oil path f of converter oil pressure controlled by the secondary regulator valve 46 is shifted from a lock-up clutch off-oil path 9 to an on-oil path n and guides an off-oil path g to a drain circuit. A first shift valve 51 is adapted to shift first speed and second speed (first speed and third speed of the transmission 1 as a whole) of the main shifting unit 21 and is actuated by the solenoid valve $S_1$. That is, when the solenoid valve $S_1$ is turned off, an oil chamber i is subjected to the line pressure to block the line pressure oil path a at D range, S range and L range of the manual valve 40. On the other hand, when the solenoid valve $S_1$ is turned on, the oil path a is caused to communicate with an oil path j to feed the line pressure to the brake $B_2$ and $B_2$ accumulator $B_2A$. A second shift valve 52 is adapted to shift second speed and third speed (three speed and fifth speed of the transmission as a whole) of the main shifting unit 21 and is actuated by the solenoid valve $S_2$. That is, when the solenoid valve $S_2$ is turned off, an oil chamber k is subjected to the line pressure to cause a line pressure oil path l to communicate with an oil path m so that the line pressure is fed to a direct clutch $C_2$ and $C_2$ accumulator $C_2A$. On the other hand, when the solenoid valve $S_2$ is turned on, the line pressure oil path l is blocked. A third shift valve 53 is adapted to shift the sub-shifting unit 16 and is actuated by the solenoid valve $S_3$. That is, when the solenoid valve $S_3$ is turned on, an oil chamber n is subjected to the line pressure to cause the line pressure oil path l to communicate with an oil path o, so that the line pressure is fed to the O/D brake $B_o$ and $B_o$ accumulator $B_oA$ through a $B_o$ release control valve 65 as will be described later. On the other hand, when the solenoid valve $S_3$ is turned off, the line pressure oil path l communicates with an oil path q to transfer the line pressure to an O/D direct clutch $C_o$ and $CO_o$ accumulator $C_oA$. A first coast modulator valve 55 is adapted to control the pressure of the line pressure in the oil path l fed from a port c through the second shift valve 52 to the coast modulator pressure at L range of the manual valve 40 and to feed the coast modulator pressure to first and Rev brakes $B_3$ through the first shift valve 51. A second coast modulator valve 56 is adapted to control the pressure of the line pressure in the oil path l fed from a port b through the second shift valve 52 and first shift valve 51 to the coast modulator pressure at S range of the manual valve 40 and to feed the coast modulator pressure to the second brake $B_1$. The first accumulator control valve 57 feeds the throttle pressure to an oil chamber r, so that the oil pressure fed through a second accumulator control valve 70 as will be described later, is controlled to become the accumulator controlled pressure and the controlled pressure is fed to respective back pressure chambers 59, 60 and 61 of the $B_o$ accumulator $B_oA$, $C_2$ accumulator $C_2A$ and $B_2$ accumulator $B_2A$.

Furthermore, in addition to the above-mentioned respective hydraulic devices, the present hydraulic shift control mechanism 5 is provided with a $S_D$ modulator valve 65, a $B_o$ release control valve 66, a $B_o$ sequence valve 67, and a second accumulator control valve 70.

Figure 4:
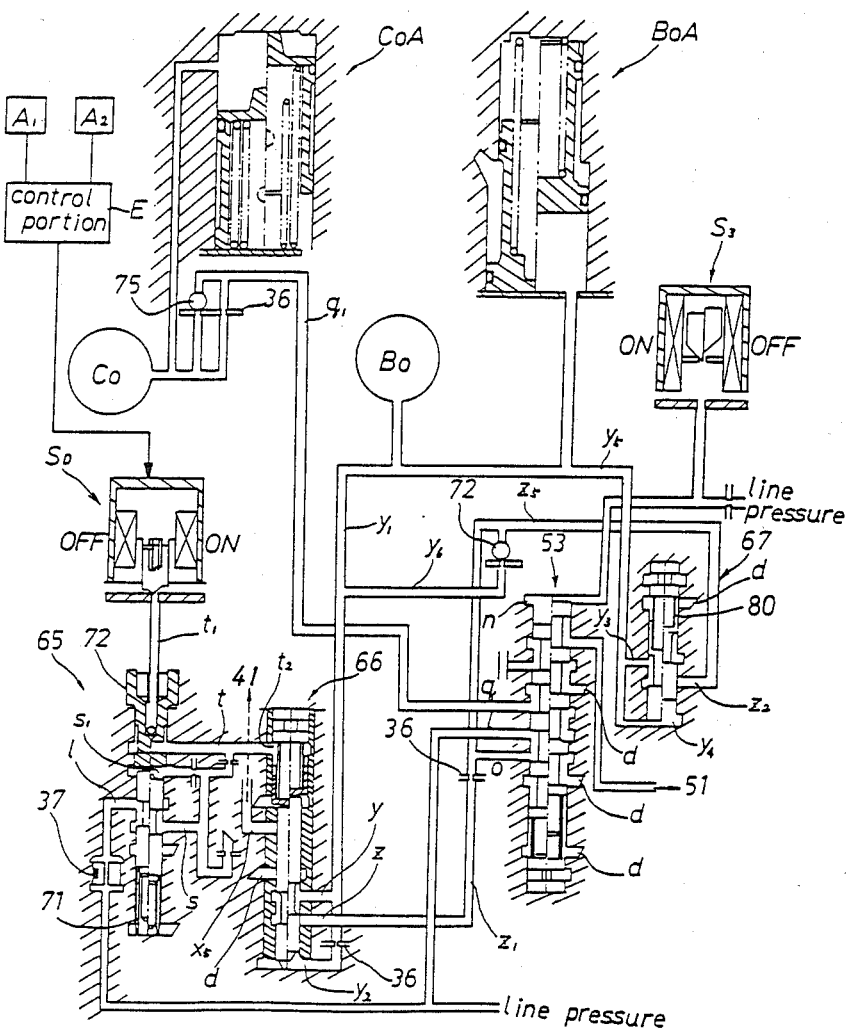
FIG. 4 is an illustration showing a main part of the hydraulic circuit shown in FIG. 3.

The $S_D$ modulator valve 65 as shown in detail in FIG. 4, is fed with the line pressure from the line pressure port l through the oil filter 37, and communicates with the upper end oil chamber $S_1$ through the oil path s. The line pressure is controlled to a predetermined pressure (4 kg/cm$^2$, for example) due to the balancing of the feed back pressure acting on the oil chamber $s_1$ and a spring 71. In addition, the controlled solenoid modulator pressure is fed to an oil path t. The oil path t communicates with the solenoid valve $S_D$ through a plug 72 and an oil path $t_1$ and further to the $B_o$ release control valve 66. The control pressure due to on-off control or duty control of the solenoid valve $S_D$ is fed to an oil chamber $t_2$ to control the control valve 66. Although the solenoid valve $S_D$ is controlled by signals from the control portion E based on the rotary sensors $A_1$ and $A_2$, when the valve $S_D$ is on-off controlled, the throttle pressure is fed to an oil path $x_5$ to set a brake release pressure corresponding to a change of loads. A port y of the $B_o$ release control valve 66 communicates with the O/D brake $B_o$ and $B_o$ accumulator $B_oA$ through an oil path $y_1$ and further with a lower end oil chamber $y_2$ as a feed back pressure through the orifice 36. The brake $B_o$ and the accumulator $B_oA$ also communicates with a port $y_3$ of the sequence valve 67 through a by-path $y_5$ and further with a lower end oil chamber $y_4$ of the valve 67 as a feed back pressure. Although the feed back pressure of the oil chamber $y_4$ is balanced with a spring 80 at the upper end thereof, the spring 80 is set to an initial operation pressure of the piston for start contacting the brake plates of the O/D brake $B_o$. Accordingly, the sequence valve 67 is held in the left half position until the initial operation pressure is reached and the oil pressure is fed to the O/D brake $B_o$ through the ports $z_2$ and $y_3$. When the feed back pressure exceeds the initial operation pressure, the sequence valve 67 is shifted to the right half position to block the ports $z_2$ and $y_3$. The port z of the control valve 66 communicates with the port o of the third shift valve 53 through the oil path $z_1$ and the orifice 36 and further with the port $z_2$ of the $B_o$ sequence valve 67 from the port o through the by-path $Z_5$. An oil path $y_6$ branching off from the oil path $y_1$ communicates with the by-path $z_5$ through a check valve 72. On the other hand, the third shift valve 53 is communicated at its upper chamber n with the solenoid valve $S_3$ and the port l communicates with the line pressure. In addition, a port q communicates with the O/D direct clutch $C_o$ and $C_o$ accumulator $C_oA$ through an oil path $q_1$ and the orifice 36. The orifice 36 of the oil path $q_1$ is provided in parallel with a check valve 75 permitting distance from the clutch $C_o$. In the figure, d denotes a drain port.

And, as shown in FIG. 1, the second accumulator control valve 70 includes spools 85 and 86 respectively energized upwardly by springs 89 and 90, line pressure ports $l_1$ and $l_2$ communicates with the line pressure oil passage, pressure controlling out-ports $u_1$ and feed back port $u_3$. The spool 85 is formed at its upper end with an upper oil chamber $G_3$, and the lower end of a cup 87 with the spring disposed in its contracted state is formed with a lower oil chamber $j_2$. The first accumulator control valve 57 includes a spool 91 having a narrow hole 91a for pressure control. The valve 57 further includes an in-port $u_2$ communicating with the ports $u_1$ and $u_3$ through an oil path u, an out-port $v_1$ communicating with the back pressure chambers 59, 60 and 61 of the respective accumulators $B_oA$, $C_2A$ and $B_2A$ and a lower oil chamber r to which a throttle pressure is fed from the throttle valve 41. The upper oil chamber $G_3$ of the second accumulator control valve 70 communicates with the inter-switching check valve 81 for preventing the discharge to one of them through the oil path G, while the lower oil chamber $j_2$ communicates with the port j of the first shift valve 51 through the oil path $j_1$. The port j of the first shift valve 51 communicates with the brake $B_2$ and accumulator $B_2A$ through the oil path $j_3$ and orifice 36 (with check valve). A port $a_2$ to be shifted to a communicating or blocked position with respect to the port j communicates with the forward clutch $C_1$ and port a of the manual valve 40. The inter-switching check valve 81 communicates at its port $G_1$ with the O/D direct clutch $C_o$ through the oil path $q_3$ and at its port $G_2$ with the brakes $B_2$ through the oil path $G_5$.

Next, the function of the present embodiment will be described.

The respective solenoid valves $S_1$, $S_2$, $S_3$, $S_L$ and $S_D$, the respective clutches $C_o$, $C_1$, and $C_2$, the respective brakes $B_o$, $B_1$, $B_2$ and $B_3$, and the respective one-way clutches (OWC) $F_o$, $F_1$ and $F_2$ of the multistage automatic transmission 1 according to the present embodiment are controlled at the shifting stages in the respective positions P, R, N, D, S and L as shown in the operation table of FIG. 5.

Figure 6:
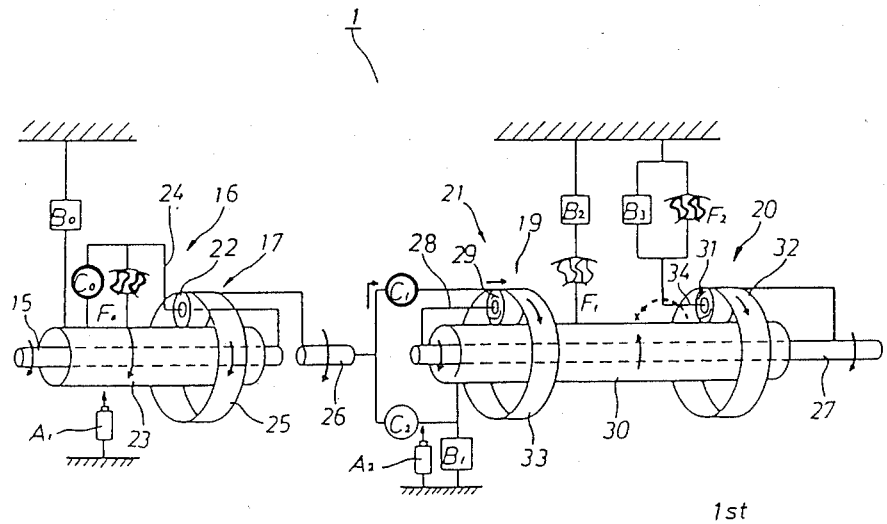
FIG. 6 through FIG. 12 illustrate the operation of the automatic transmission in different operating states.

That is, when in first speed at the D range or S range, as shown in FIG. 6, the O/D direct clutch $C_o$, one-way clutches $F_o$ and $F_2$, and forward clutch $C_1$ are engaged, and the remaining frictional engagement elements are held in the released state. Accordingly, in the sub-shifting unit 16, the planetary gear unit 17 is integrated through the clutch $C_o$ and one-way clutch $F_o$. Therefore the planetary gear unit 17 is held in the directly connected state, wherein rotation of the input shaft 15 is transmitted to the input shaft 26 of the main shifting unit 21 as it is. In the main shifting unit 21, rotation of the input shaft 26 is transmitted to the ring gear 33 of the front planetary gear unit 19 through the clutch $C_1$, and further to the carrier 28 and the output shaft 27 integrally formed with the carrier 28. At the same time, a leftward rotating power is applied to the carrier 34 of the planetary gear unit 20 through the sun gear 30. However, the rotating force is prevented by the one-way clutch $F_2$, and the planetary gear 31 is rotated about its own axis to transmit the force to the ring gear 32 integrally formed with the output shaft 27. That is, the main shifting unit 21 in the first speed state accompanied with the sub-shifting unit 16 in the directly connected state render the transmission as a whole to assume a first speed. At this time, in the main shifting unit 21, the force transmitted from input shaft 26 is transmitted through two routes; one to the output shaft 27 from the front planetary gear unit 19 and the other to the output shaft 27 through the rear planetary gear unit 20. Accordingly, loads received by the gears are dispersed to that extent.

And, with the transmission in first speed, the solenoid valve $S_3$ is in its off-state and the third shift valve 53 is held in the right half position, and the line pressure of the line port l is fed to the O/D clutch $C_o$ and $C_o$ accumulator $C_oA$ through the port q and oil path $q_1$ and to the upper oil chamber $G_3$ of the second accumulator control valve 70 through the oil path $q_3$ and interswitching check valve 81. On the other hand, the solenoid valve $S_1$ is in its off-state and the first shift valve 51 is held in the right half position shown in FIG. 1. The line pressure to be fed from the line port l through the port a in the manual valve 40 is fed to the forward clutch $C_1$. However, since the port $a_2$ at the first shift valve 51 is blocked, the oil pressure is not subjected to the brake $B_2$ and the lower oil chamber $j_2$ of the second accumulator control valve 70. Accordingly, the control valve 70 is held in the left half position shown in FIG. 1 by the oil pressure of the upper oil chamber $G_3$, and the line pressure from the line pressure port $l_2$ is transferred through the pressure controlling out-port $u_1$ without being reduced in pressure and further to the in-port $u_2$ of the first accumulator control valve 57 through the oil path u. And, the first valve 57 transfers the oil pressure from the port $u_2$ to the out-port $v_1$ after that oil pressure is properly pressure controlled by the throttle pressure acting on the oil chamber r. That is, the oil pressure is pressure controlled so that the pressure will drop around the throttle low opening degree, and be fed to the back pressure chambers 59, 60 and 61 of the respective accumulators $B_oA$, $C_2A$ and $B_2A$ through the oil path v. Accordingly, when the transmission is in first, the respective accumulators have a large torque capacity corresponding to the transmitting torque due to the direct connection of the sub-shifting unit 16.

When in second speed at the D range and S range, as shown in FIG. 7, the O/D brake $B_o$, one-way clutch $F_2$ and forward clutch $C_1$ are engaged, and the remaining frictional engagement elements are in a released state. Accordingly, in the sub-shifting unit 16, the sun gear 23 is locked by the brake $B_o$, and the planetary gear 22 is rotated about its own axis while the carrier 24 is being rotated to transmit the power to ring gear 25, and the speed-increasing rotation (O/D) is transmitted to the input shaft 26 of the main shifting unit 21. The main shifting unit 21 is the same as in the aforementioned first speed state. Accordingly, the first speed of the main shifting unit 21 accompanied with the speed-increasing rotation (O/D) of the sub-shifting unit 16 renders a second speed of the transmission as a whole.

At this time, as shown in FIG. 4, the solenoid valve $S_3$ is turned on and the third shift valve 53 is fed at its upper oil chamber n with the line pressure and shifted to the state shown in the left half of the figure. Then, the pressure oil within the clutch $C_o$ and $C_o$ accumulator $C_oA$ is discharged to the drain port d from the port q to release the clutch $C_o$. At the same time, the line pressure port l communicates with the port o. The line pressure from the port o is fed directly to the O/D brake $B_o$ through the by-path $z_5$, ports $z_2$ and $y_3$ of the sequence valve 67 and by-path $y_5$ until the initial operating pressure of the $B_o$ piston is reached. When the line pressure exceeds the $B_o$ piston initial operating pressure, the valve 67 is shifted to the right half position due to the feed back pressure exerted in the oil chamber $y_4$. Thereafter, the line pressure from the port o is fed to the port z of the $B_o$ release control valve 66 through the orifice 36 and oil path $z_1$. In the foregoing state, the control valve 66 is located in the left half position shown in FIG. 4, and the port z communicates with the port y. Further, the line pressure is fed to the brake $B_o$ and $B_o$ accumulator $B_oA$ through the oil path $y_1$ to engage the brake $B_o$.

And, when shifting from first speed to second speed, due to the draining of the O/D clutch $C_o$, the second accumulator control valve 70 has the oil pressure from its upper oil chamber $G_3$ drained through the port $G_1$ of the inter-switching check valve 81, and the spools 85 and 86 of the control valve 70 are returned upwardly due to the springs 89 and 90, and the valve 70 is held in the right half position shown in FIG. 1. In the foregoing state of balancing, the oil pressure from the line pressure port $l_1$ acting on the upper end of the spool 86 balances the feed back pressure from the port $u_3$ acting on the lower end of the spool 86 and the energizing power of the spring 90. Accordingly, the line pressure of the port $l_2$ is reduced to about 80% and is transferred to the pressure controlling out-port $u_1$. Further, the reduced oil pressure is fed to the in-port $v_1$ of the first accumulator control valve 57. After properly pressure controlled by the valve 57, the oil pressure is subjected to the back pressure chambers 59, 60 and 61 of the respective accumulators $B_oA$, $C_2A$ and $B_2A$ at about 80% oil pressure compared with the case when shifting from fifth speed to sixth speed as will be described later. Accordingly, the torque capacity of the respective accumulators, inter alia, the accumulator $B_oA$ is reduced in order to correspond to the load torque.

When in third speed at D range, as shown in FIG. 8, the O/D clutch $C_o$, one-way clutch $F_o$, forward clutch $C_1$, one-way clutch $F_1$ and brake $B_2$ are engaged and the remaining frictional engagemet elements are held in the released state. Accordingly, the sub-shifting unit 16 is in the directly connected state as mentioned before, and rotation of the input shaft 15 is transmitted to the input shaft 26 of the main shifting unit 21 as it is. Although in the main shifting unit 21, rotation of the input shaft 26 transmitted to the ring gear 33 of the front gear unit 19 through the clutch $C_1$ renders a leftward rotating power to the sun gear 30 through the planetary gear unit 29, the sun gear 30 is prevented from being rotated in that direction by the one-way clutch $F_1$ due to engagement of the brake $B_2$. Accordingly, the gear 29 causes the carrier 28 to rotate while rotating about its own axis, and the second speed state rotation is transmitted to the output shaft 27 through only the front gear unit 19. Due to the foregoing, the directly connected state of the sub-shifting unit 16 accompanied with second speed state of the main shifting unit 21 renders a third speed of the transmission 1 as a whole.

At this time, the solenoid valve $S_1$ is turned on to shift the first shift valve 51 to the left half position shown in FIG. 1 to communicate the line pressure of the port $a_2$ to the port j, so that the line pressure is fed to the brake $B_2$ and accumulator $B_2A$ through the oil path $j_3$ and orifice 36. The shifting state of the main shifting unit 21, i.e. the change of the rotation of the sun gear 30 due to the foregoing is sensed by the rotary sensor $A_2$, and the solenoid valve $S_D$ is duty controlled (or on controlled) according to electric signals from the control portion E, so that the modulator pressure of the oil path t is reduced. That is, although the $S_D$ modulator 65 feeds the line pressure of the line port l to the oil path t after pressure controlling thereof by the spring 71 and the feed back pressure in the upper oil chamber $s_1$, the modulator pressure is reduced due to the control of the solenoid valve $S_D$ and the pressure of the upper oil chamber $t_2$ of the $B_o$ release control valve 66 communicating with the oil path t is also reduced. Accordingly, the control valve 66 is brought to the right half position of FIG. 4, while receiving the feed back pressure at the lower oil chamber $y_2$ thereof from the brake $B_o$, and the oil pressure from the brake $B_o$ and accumulator $B_oA$ is discharged to the drain port d through the oil path $y_1$ and port y. At this time, upon detection of the completion of the shifting of the main shifting unit 21, i.e., the stopping of rotation of the sun gear 30 as detected by the rotary sensor $A_2$, the solenoid valve $S_3$ is turned off according to electric signals from the control portion E to shift the third shift valve 53 to the right half position shown in FIG. 1. Then, the line pressure port l communicates with the port q, and the line pressure is fed to the clutch $C_o$ and $C_o$ accumulator $C_oA$ through the oil path $q_1$ to actuate the clutch $C_o$ and with communicate the port o to the drain port d, so that oil pressure of the O/D brake $B_o$ will be promptly and completely drained through the drain port d via the oil path $y_6$, check valve 72, oil path $z_5$ and port o to complete the shifting of the sub-shifting unit 16. Due to the foregoing, the releasing operation of the O/D brake $B_o$ coincides with the engaging operation of the brake $B_2$.

And, in the shifting process to the third speed, due to the shifting of the first shift valve 51 to the left half position shown in FIG. 1, the line pressure from the port $a_2$ is fed directly to the lower oil chamber $j_2$ of the second accumulator control valve 70 through the port j and oil path $j_1$, and the oil pressure is more promptly fed to the lower oil chamber $j_2$ than to the upper oil chamber $G_3$ due to the feeding of a oil pressure to the brake $B_2$ through the orifice 36 and the feeding of a oil pressure to the clutch $C_o$ due to the turning off of the solenoid valve $S_3$. Accordingly, the cup 87 of the second valve 70 is lifted up by the oil pressure acting on the lower oil chamber $j_2$. As a result, the spring 90 is in-crease the upward movement of the spool 86. Due to the foregoing, the pressure reducing quantity at the time when the pressure oil is transferred to the pressure controlling out-port $u_1$ from the line pressure port $l_2$ is further increased. As a result, an oil pressure which is pressure reduced by about 70% with respect to the line pressure is fed to the in-port $u_2$ of the first valve 57 through the oil path u. And, as in the same manner as described above, the oil pressure after being reduced by the first valve 57 is fed to the back pressure chambers 59, 60 and 61 of the respective accumulators $B_oA$, $C_2A$ and $B_2A$ to reduce the torque capacity of the $B_2$ accumulator $B_2A$ according to the load torque of the brake $B_2$. And, when the brake $B_2$ (and clutch $C_o$) is smoothly engaged, the oil pressure fed to the brake $B_2$ (and clutch $C_o$) is fed to the upper oil chamber $G_3$ of the second valve 70 through the oil path $G_5$ (and $q_3$) and inter-switching check valve 81. Then, as in first speed, the second valve 70 is held in the left half position, and the line pressure from the port $l_2$ is fed to the in-port $u_2$ of the first valve 57 through the port $u_1$ and oil path u.

Figure 9:
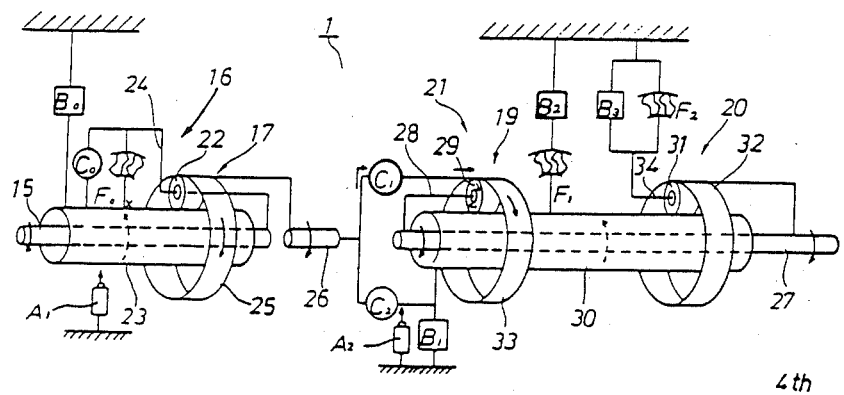

When in fourth speed at D range, as shown in FIG. 9, the O/D brake $B_o$, forward clutch $C_1$, brake $B_2$ and one-way clutch $F_1$ are engaged, and the remaining frictional engagement elements are held in the released state. Accordingly, the sub-shifting unit 16 is held in the speed increasing (O/D) state as mentioned before and the main shifting unit 21 is held in the second speed state, thus enabling a fourth speed of the transmission 1 as a whole to be obtained.

And, when in fourth speed, the second accumulator control valve 70 is drained through the oil path $q_3$ due to the releasing of the O/D clutch $C_o$. However, due to the engagement of the brake $B_2$, the line pressure is held in state and is fed to the upper oil chamber $G_3$ through the port $G_1$ of the inter-switching check valve 81. Accordingly, the spool 86 is held in the left half position to transfer the line pressure to the port u.

Figure 10:
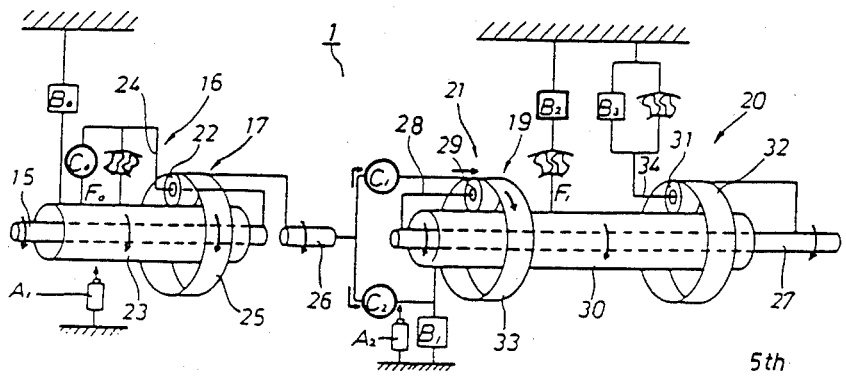

When in fifth speed at D range, as shown in FIG. 10, the O/D clutch $C_o$, one-way clutch $F_o$, forward clutch $C_1$, direct clutch $C_2$ and brake $B_2$ are engaged and the remaining frictional engagement elements are held in the released state. Accordingly, the sub-shifting unit 16 is held in the directly connected state as mentioned before. The main shifting unit 21 has an integrally formed front planetary gear unit 19 due to engagement of the clutches $C_1$ and $C_2$, and rotation of the input shaft 26 is transmitted to the output shaft 27 as it is. Due to the foregoing, the direct connection of the sub-shifting unit 16 accompanied with third speed state speed (direct connection) of the main shifting unit 21 enable a fifth speed of the transmission 1 as a whole to be obtained, wherein the input shaft 15 and output shaft 12 are integrally rotated.

Figure 11:
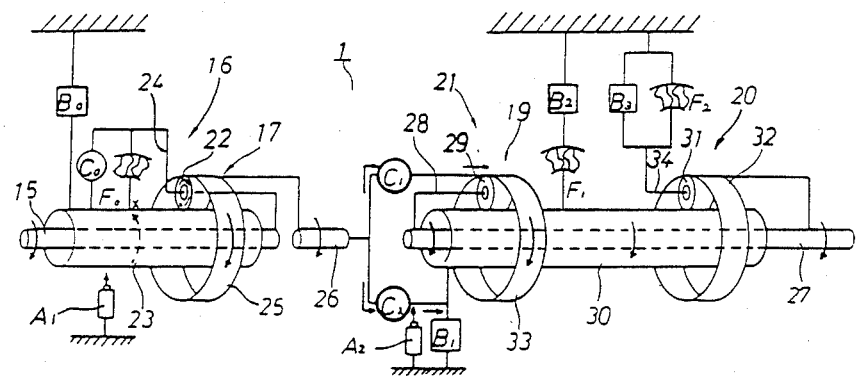

When in sixth speed at D range, as shown in FIG. 11, the O/D brake $B_o$, forward clutch $C_1$, direct clutch $C_2$ and brake $B_2$ are engaged, and the remaining frictional engagement elements are held in the released state. Accordingly, the sub-shifting unit 16 is held in the speed increasing (O/D) state as mentioned before and the main shifting unit 21 is held in the third speed state also as mentioned before. Before the shifting units 16 and 21 altogether enable a sixth speed of the transmission 1 as a whole to be obtained.

And, when in fifth speed and sixth speed, as when in third speed, the feeding oil pressure to the brake $B_2$ is held in state and acts on the upper oil chamber $G_3$, and the second valve 70 is locked to the left half position. As a result, the line pressure is fed to the oil path u.

Figure 12:
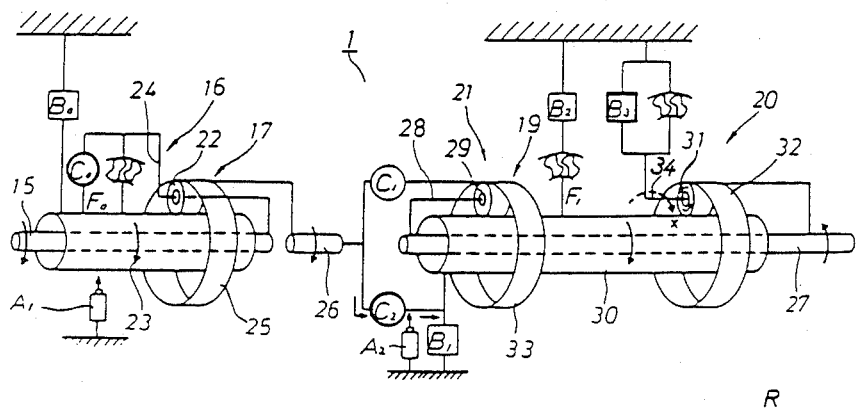

When in R range, as shown in FIG. 12, the O/D clutch $C_o$, one-way clutch $F_o$, direct clutch $C_2$ and brake $B_3$ are engaged, and the remaining frictional engagement elements are held in the released state. Accordingly, the sub-shifting unit 16 is held in the directly connected state, while the main shifting unit 21 is held in a state in which rotation of the input shaft 26 is directly transmitted to the sun gear 30 by the clutch $C_2$, and, since rotation of the carrier 34 of the rear planetary gear unit 20 is locked by the brake $B_3$, the rotation of the sun gear 30 is transmitted to the ring gear 32 as a reverse rotation through rotation of the planetary gear 31 rotating about its own axis. As a result, the output shaft 27 is rotated reversely.

And, in the reverse state, due to the shifting of the manual valve 40 to the R range, no line pressure is fed to the port a, and the oil pressure within the brake $B_2$ is drained. However, the third shift valve 53 is held in the right half position shown in FIG. 1, the oil pressure of and the line pressure port l is fed to the O/D clutch $C_o$ through the port q. Accordingly, in the foregoing state, the second accumulator control valve 70 is held in the left half position as in first speed, since the feeding oil pressure to the O/D clutch $C_o$ is fed to the upper oil chamber $G_3$. As a result, the line pressure is fed to the oil path u.

Although the circuit to the brake $B_2$ is drained in the P range and N range, the third selenoid $S_3$ is in the off state. Accordingly, the second accumulator control valve 70 is held in the line pressure feeding position as when in the R range.

When in third speed and fourth speed at S range or L range, the second coast brake $B_1$ is engaged as aforementioned when in third speed and fourth speed at D range (see FIGS. 8 and 9). Accordingly, rotation of the sun gear 30 is prevented in both directions, thus enabling engine braking to be effected. At this time, in order to shift from second speed to third speed, as when in the D range, the solenoid valve $S_D$ is controlled so that the sub-shifting unit 16 and main shifting unit 21 will be shifted simultaneously.

When in as in first speed and second speed at L range, the first and Rev brake $B_3$ is engaged as in first speed and second speed at D range (see FIGS. 6 and 7). Accordingly, rotation of the carrier 34 of the rear planetary gear unit 20 is prevented in both directions, thus enabling engine braking to be effected.

When in third speed and fourth speed, and first speed and second speed at the S range and L range, regarding the second accumulator control valve 70, shifting thereof is the same as when shifting at the D range.

In the above mentioned embodiment, there has been described a rear wheel drive longitudinal automatic transmission, wherein the sub-shifting unit 16 is disposed at the front stage and the main shifting unit 21 is disposed at the rear stage. However, the present invention may of course be applied to a front wheel drive transverse automatic transmission, wherein the main shifting unit is disposed at the front stage and the sub-shifting unit is disposed at the rear stage.

The effects of the above mentioned embodiment will be summarized as follow.

If the present invention is applied to a multistage automatic transmission for effecting a multistage shifting by combining the respective shifting stages of the sub-shifting unit 16 and main shifting unit 21, when the main shifting unit 21 is up shifted to a predetermined stage with the sub-shifting unit 16 held in the high speed stage (O/D), and the sub-shifting unit 16 is up shifted (direct connection to O/D) with the main shifting unit 21 held in the low speed stage (first speed), the oil pressure acting on the back pressure chambers 59, 60 and 61 of the accumulators $B_oA$, $C_2A$ and $B_2A$ is reduced by a predetermined quantity. Accordingly, there can be obtained a proper accumulator capacity corresponding to the load torque acting on the frictional engagement elements $B_o$ and $B_2$. Thus, a shift feeling can be improved by reducing the gear shift shock. Further, since the second accumulator control valve 70 is simply added in addition to the conventional first accumulator control valve 57, a proper accumulator capacity in the multistage transmission 1 can be obtained by using identical accumulators $B_oA$, $C_2A$ and $B_2A$.

Further, if the oil chamber $j_2$ at the opposite side with respect to the energizing direction of the spool 86 in the second accumulator valve 70 directly communicated with the feeding oil path $j_3$ of the friction engaging element $B_2$ which engages at more than a predetermined state of the main shifting unit 21, and the oil chamber $G_3$ at the side of the energizing direction of the spool communicates with the friction engaging element $B_2$ and the friction engaging element $C_o$ which engages at the low speed stage of sub-shifting unit 16, the pressure reducing quantity of the accumulator back pressure at the time when the main shifting unit 21 is up shifted can be set larger than the pressure reducing quantity at the time when the sub-shifting unit 16 is up shifted. Accordingly, a proper accumulator capacity corresponding to the load torque of the respective friction engaging elements $B_o$ and $B_2$ can always be obtained under any shifting state.

Further, if the overdrive planetary gear unit 17 is used as the sub-shifting unit 16, and the front planetary gear unit 19 and rear planetary gear unit 20 are used as the main shifting unit 21, the conventional overdrive attached automatic shift gear mechanism can be used almost as it is. Thus, the multistage automatic transmission 1 can be offered at low expense without much modification of the manufacturing equipment.

Although the present invention has been described with reference to the preferred embodiment, the embodiment described herein is for illustrative purposes only and not in limitation thereof. Also, the scope of the present invention is defined in the appended claims and will not be bound by description of the embodiment. Accordingly, it will be understood that all changes and modifications which belong to the appended claims fall within the true spirit and scope of the present invention.

What is claimed is:

1. An accumulator back pressure control apparatus for controlling the back pressure of accumulators in an automatic transmission that is responsive to both throttle pressure introduced to the automatic transmission and shifting states of predetermined elements of a shift gear mechanism of the automatic transmission the automatic transmission comprising the shift gear mechanism and friction engaging elements for selectively engaging the predetermined elements of the shift gear mechanism, said accumulator back pressure control apparatus comprising:

hydraulic servos for controlling the friction engaging elements to selectively engage the predetermined elements;

respective accumulators each having a back pressure chamber communicating with one of said hydraulic servos;

a control oil source from which pressurized oil passes;

a shift control means between said control oil source and said hydraulic servos for moving between control positions to selectively communicate an oil path between said control oil source and said hydraulic servos in response to the shifting states;

a first accumulator control valve having a pressure controlling port communicating with said back pressure chambers for regulating the oil pressure of oil fed to the pressure controlling port and then therethrough to said back pressure chambers in response to a signal corresponding to the throttle pressure;

a second accumulator control valve having a pressure controlling out-port communicating with said pressure controlling port of said first accumulator control valve and through which the oil fed to the pressure controlling port of the first accumulator control valve passes, and a first port communicating with said control oil source and receiving pressurized oil therefrom, said first accumulator control valve being in operative hydraulic communication with said shift control means and being controlled thereby in response to the operating position assumed by the shift control means to selectively communicate said first port and said pressure controlling out-port to increase or decrease the pressure of the oil passing from the pressure controlling out-port to the pressure controlling port of said first accumulator control valve.

2. An accumulator back pressure control apparatus for controlling the back pressure of accumulators in an automatic transmission that is responsive to both throttle pressure introduced to the automatic transmission and shifting states of a shift gear mechanism comprising a sub-shifting unit and a main shifting unit of the automatic transmission, the automatic transmission comprising the sub-shifting unit and the main shifting unit which together facilitate multi-stage shifting of the automatic transmission and friction engaging elements for selecting a force transmitting path through said sub-shifting and said main shifting units to effect the multi-stage shifting, said accumulator back pressure control apparatus comprising:

hydraulic servos for controlling respective ones of said friction engaging elements to thereby select a transmitting path and establish one of the shifting states of the shift gear mechanism;

respective accumulators each having a back pressure chamber communicating with one of said hydraulic servos for absorbing shock resulting from the shifting associated with the multi-stage shifting;

a first accumulator control valve having a pressure controlling port communicating with said back pressure chambers for regulating the oil pressure of oil fed to the pressure controlling part and then therethrough to said back pressure chambers in response to the throttle pressure;

a second accumulator control valve having a pressure controlling out-port communicating with said pressure controlling port of said first accumulator control valve and through which the oil fed to the pressure controlling port of the first accumulator control valve passes, said second accumulator control valve being in operative hydraulic communication with said hydraulic servos and being controlled thereby in response to the shifting state established by the hydraulic servos and friction engagement elements controlled thereby to reduce the pressure of oil passed from the pressure controlling out-port when the main shifting unit is upshifted to a predetermined state with the sub-shifting unit held in a high speed stage and when the sub-shifting unit is upshifted with said main shifting unit held in a low speed stage.

3. An accumulator back pressure control apparatus for an automatic transmission as claimed in claim 2, wherein said second accumulator control valve includes a spool biased in one direction and oil chambers at both ends of the spool;

an oil chamber located at the opposite end thereof with respect to the direction in which the spool is biased directly communicates with a feeding oil path of one of the hydraulic servos controlling one of the friction engaging elements which engages when said main shifting unit is in higher than a predetermined stage; and an oil chamber located at the other end of the spool communicates with another of the hydraulic servos controlling another of the friction engaging elements which engages when said main shifting unit is in higher than a predetermined stage and another of the hydraulic servos controlling another of the friction engaging elements which engages when in a low speed stage of the sub-shifting unit.

4. An accumulator back pressure control apparatus for an automatic transmission as claimed in claim 2, wherein said sub-shifting unit is an overdrive planetary gear unit;

said main shifting unit comprises a front planetary gear unit and a rear planetary gear unit;

one of the friction engaging elements is associated with said sub-shifting unit and comprises a direct clutch of said overdrive planetary gear unit; and another of the friction engaging elements is associated with the main shifting unit and comprises a brake for locking an outer race of a one-way clutch for preventing the unidirectional rotation of a sun gear in said front and rear planetary gear units.

* * * * *